(12) United States Patent
Matsushima et al.

(10) Patent No.: US 11,774,793 B2
(45) Date of Patent: Oct. 3, 2023

(54) ELECTRONIC APPARATUS AND DISPLAY DEVICE

(71) Applicant: Japan Display Inc., Tokyo (JP)

(72) Inventors: Toshiharu Matsushima, Tokyo (JP); Yukiya Hirabayashi, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 17/891,166

(22) Filed: Aug. 19, 2022

(65) Prior Publication Data
US 2023/0056040 A1    Feb. 23, 2023

(30) Foreign Application Priority Data
Aug. 23, 2021  (JP) ................... 2021-135443

(51) Int. Cl.
*G02F 1/1333* (2006.01)
*G02F 1/1335* (2006.01)
*G02F 1/1334* (2006.01)
*G02F 1/1362* (2006.01)
*G02F 1/1347* (2006.01)

(52) U.S. Cl.
CPC ...... *G02F 1/133388* (2021.01); *G02F 1/1334* (2013.01); *G02F 1/1347* (2013.01); *G02F 1/133528* (2013.01); *G02F 1/133607* (2021.01); *G02F 1/136286* (2013.01)

(58) Field of Classification Search
None
See application file for complete search history.

(56) References Cited

U.S. PATENT DOCUMENTS 5,581,380 A * 12/1996 Bergman .......... G02F 1/133615
                                                          349/110
2020/0278586 A1* 9/2020 Kimura ............... G02F 1/13439

FOREIGN PATENT DOCUMENTS

JP          2020-140157 A      9/2020

* cited by examiner

*Primary Examiner* — Phu Vu
(74) *Attorney, Agent, or Firm* — XSENSUS LLP (57) ABSTRACT

According to one embodiment, an electronic apparatus includes a first substrate, a second substrate opposed to the first substrate, a liquid crystal layer held between the first substrate and the second substrate, an active area in which pixels are arranged, and a peripheral area positioned in a periphery of the active area. The peripheral area includes a drive element area in which a drive element configured to drive each of the pixels is arranged.

12 Claims, 8 Drawing Sheets

ELECTRONIC APPARATUS AND DISPLAY DEVICE

CROSS-REFERENCE TO RELATED APPLICATIONS

This application is based upon and claims the benefit of priority from Japanese Patent Application No. 2021-135443, filed Aug. 23, 2021, the entire contents of which are incorporated herein by reference.

FIELD

Embodiments described herein relate generally to an electronic apparatus and a display device.

BACKGROUND

Conventional liquid crystal panels include scan lines and signal lines in an active area, wherein an area surrounded by the scan lines and the signal lines includes pixels with switching elements electrically connected to the scan lines and the signal lines. The scan line, signal line, and switching element are formed of a low-resistive metal material, and thus, an aperture ratio of the active area in which the aforementioned elements are arranged is lowered thereby.

DETAILED DESCRIPTION

In general, according to one embodiment, an electronic apparatus comprises a first substrate, a second substrate opposed to the first substrate, a liquid crystal layer held between the first substrate and the second substrate, an active area in which pixels are arranged, and a peripheral area positioned in a periphery of the active area. The peripheral area includes a drive element area in which a drive element configured to drive each of the pixels is arranged.

Embodiments will be described hereinafter with reference to the accompanying drawings.

The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes.

However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

Note that in order for the descriptions to be easily understandable, the drawings are illustrated with an X axis, a Y axis and a Z axis which are normal to each other. A direction along the X axis is referred to as an X direction, a first direction or a row direction, a direction along the Y axis is referred to as a Y direction, a second direction or a column direction, and a direction along the X axis is referred to as a Z direction or a third direction. A plane defined by the X axis and the Y axis is referred to as an X-Y plane, and viewing towards the X-Y plane is referred to as a plan view.

Figure 1:
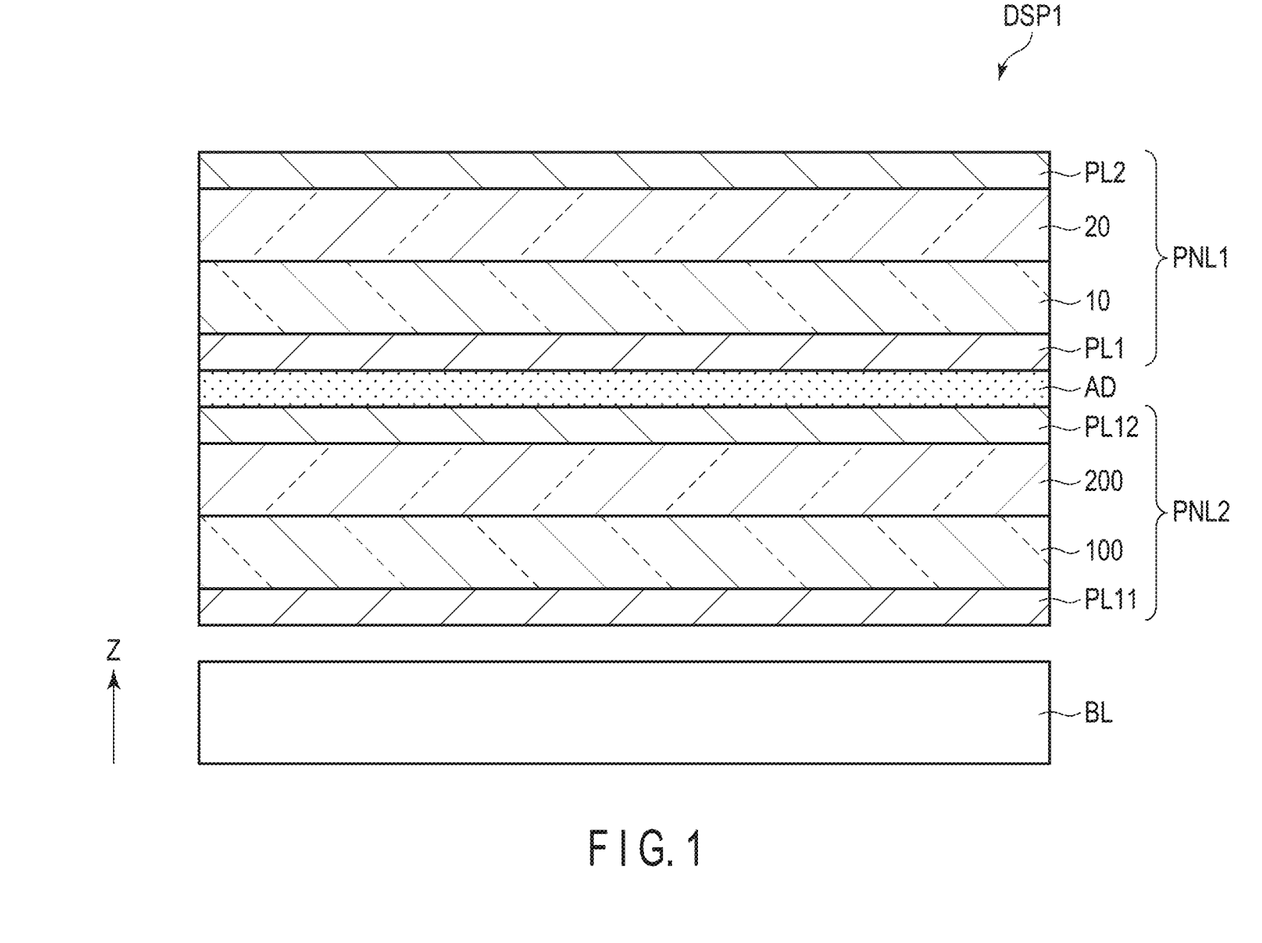
FIG. 1 is a cross-sectional view of an example of the structure of a display device of an embodiment.

FIG. 1 is a cross-sectional view of one example of the structure of a display device DSP1 of the present embodiment. As in FIG. 1, the display device DSP1 includes a liquid crystal display panel PNL1, dimming panel PNL2, and backlight BL. The dimming panel PNL2 is located in the back surface of the liquid crystal display panel PNL1, and the backlight BL is located in the back surface of the dimming panel PNL2. Note that, the dimming panel PNL2 may be referred to as electronic apparatus or liquid crystal light bulb.

As in FIG. 1, the liquid crystal display panel PNL1 includes a first substrate 10 (array substrate), second substrate 20 (counter substrate), first polarizer PL1, and second polarizer PL2. Although this is not shown in the figure, a liquid crystal layer is placed between the first substrate 10 and the second substrate 20, and the liquid crystal layer is sealed by a sealant. The liquid crystal display panel PNL1 is structured based on an in plane switching (IPS) method, or a fringe field switching (FFS) method, for example. In the present embodiment, a case where the IPS method or the FFS method is used will be explained.

On the first substrate 10, a video signal line, scan line, switching element, pixel electrode, and common electrode are formed, for example, and on the second substrate 20, a color filter, and a light shielding film are formed, for example. Since the liquid crystal display panel PNL1 can control only polarized light, the first polarizer PL1 is placed on the back surface of the first substrate 10, and the second polarizer PL2 is placed on the upper surface of the second substrate 20.

The dimming panel PNL2 is located in the back surface of the liquid crystal display panel PNL1 and includes, as in FIG. 1, a first substrate (array substrate) 100, second substrate (counter substrate) 200, first polarizer PL11, and second polarizer PL12. Although this will be detailed later, between the first substrate 100 and the second substrate 200, a liquid crystal layer is placed, and the liquid crystal layer is sealed by a sealant. The dimming panel PNL2 is structured based on a twisted nematic (TN) method, which has excellent transmittance characteristics.

As described in detail below, a signal line, scan line, switching element, electrode line (connecting line), pixel electrode, common electrode are formed, for example, on the first substrate 100. Unlike the liquid crystal display panel PNL1, the purpose of the dimming panel PNL2 is to control brightness. Therefore, forming a color image is not necessary. Therefore, no color filter or light-shielding film is formed on the second substrate 200 of the dimming panel PNL2. On the other hand, the dimming panel PNL2 also operates the optical switch by liquid crystal layer, and requires a polarizer. Therefore, the first polarizer PL11 is placed on the back surface of the first substrate 100, and the second polarizer PL12 is placed on the upper surface of the second substrate 200.

The liquid crystal display panel PNL1 and the dimming panel PNL2 are adhered together by a transparent adhesive materials AD.

The backlight BL is located in the back surface of the dimming panel PNL2. The backlight BL is a side edge type surface light source including a light source such as light emitting diode (LED), a light guide plate or a diffusion plate, and a diffusion sheet, light source sheet group such as prism sheet, and reflective sheet placed on the back surface of the light guide plate.

Figure 2:
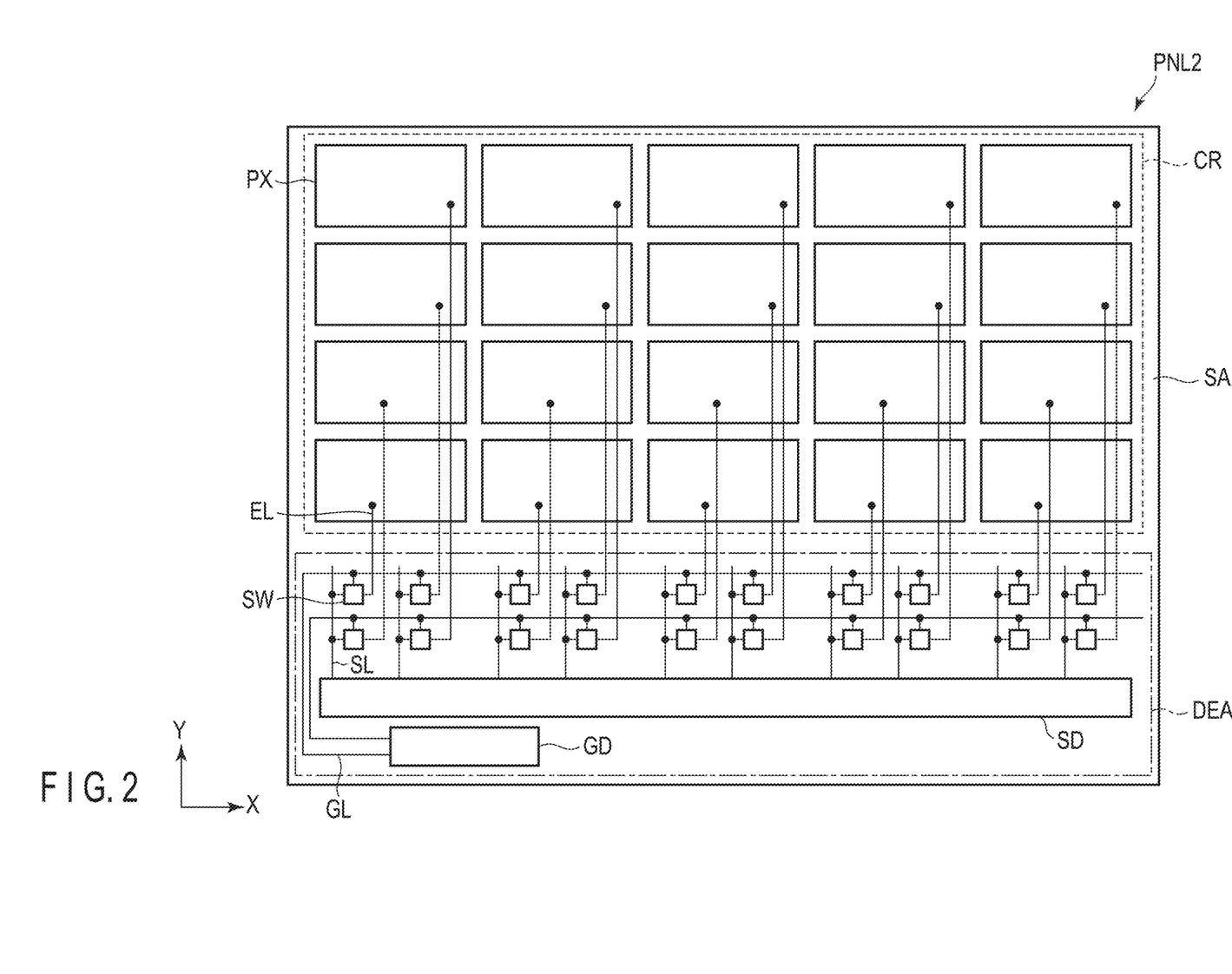
FIG. 2 is a plan view illustrating an example of the structure of a dimming panel of FIG. 1.

FIG. 2 is a plan view of an example of the structure of the dimming panel PNL2 of the present embodiment. The dimming panel PNL2 includes a light control area CR and a peripheral area SA located outside of the light control area CR. The light control area CR corresponds to the active area of the dimming panel PNL2. In the light control area CR, a number of pixels PX, specifically, (N [columns]×M [rows]) pixels PX are arranged in a matrix. As described in detail below, each pixel PX includes a pixel electrode PE, common electrode CE, liquid crystal layer LC, and electrode line (relay electrode) EL, for example.

The peripheral area SA includes a drive element area DEA. The drive element area DEA includes drive elements for driving a number of pixels PX arranged in the light control area CR.

In more detail, the drive element area DEA includes β scan lines GL, α signal lines SL, (α×β) switching elements SW, gate driver GD, source driver SD, and (α×β) electrode lines EL. Note that, a relationship equation (α×β)≥(N×M) holds between the pixels PX and the switching elements SW. The β scan lines GL extend in the first direction X and are aligned at intervals in the second direction Y. The α signal lines SL extend in the second direction Y, and are aligned at intervals in the first direction X. The (α×β) switching elements SW are arranged in a region surrounded by two adjacent scan lines GL and two adjacent signal lines SL. (In other words, the switching elements SW are arranged in the area where the scan lines GL and the signal lines SL cross each other.) Each switching element SW is formed of a thin-film transistor (TFT), for example, and is electrically connected to the scan line GL and the signal line SL. Each switching element SW is electrically connected to one corresponding pixel (pixel to be driven) among the pixels PX arranged in a matrix in the light control area CR.

One end of the scan line GL is electrically connected to the gate driver GD. The gate driver GD outputs scan signals for controlling a write operation of luminosity data to the scan line GL. One end of the signal line SL is electrically connected to the source driver SD. The luminosity data for each pixel PX is input to the signal line SL.

Each pixel PX is electrically connected to the switching element SW via the electrode line EL. The aforementioned luminosity data are input to the electrode line EL via the signal line SL and the switching element SW. Each pixel PX is supplied with a voltage corresponding to the input luminosity data. Thus, an electric field is generated between the pixel electrode PE and the common electrode CE in each pixel PX, and the electric field causes the alignment of the liquid crystal molecules in the liquid crystal layer LC to change from the initial alignment state in which no voltage is supplied. By this operation, light transmitted through each pixel PX arrayed in the light control area CR is controlled. Specifically, in one pixel PX, the light emitted from the backlight BL is transmitted, and in another pixel PX, the light emitted from the backlight BL is not transmitted (in other words, it is possible to select the light to be transmitted toward the liquid crystal display panel PNL1). Therefore, the contrast of the image displayed on the liquid crystal display panel PNL1 can be improved.

Figure 3:
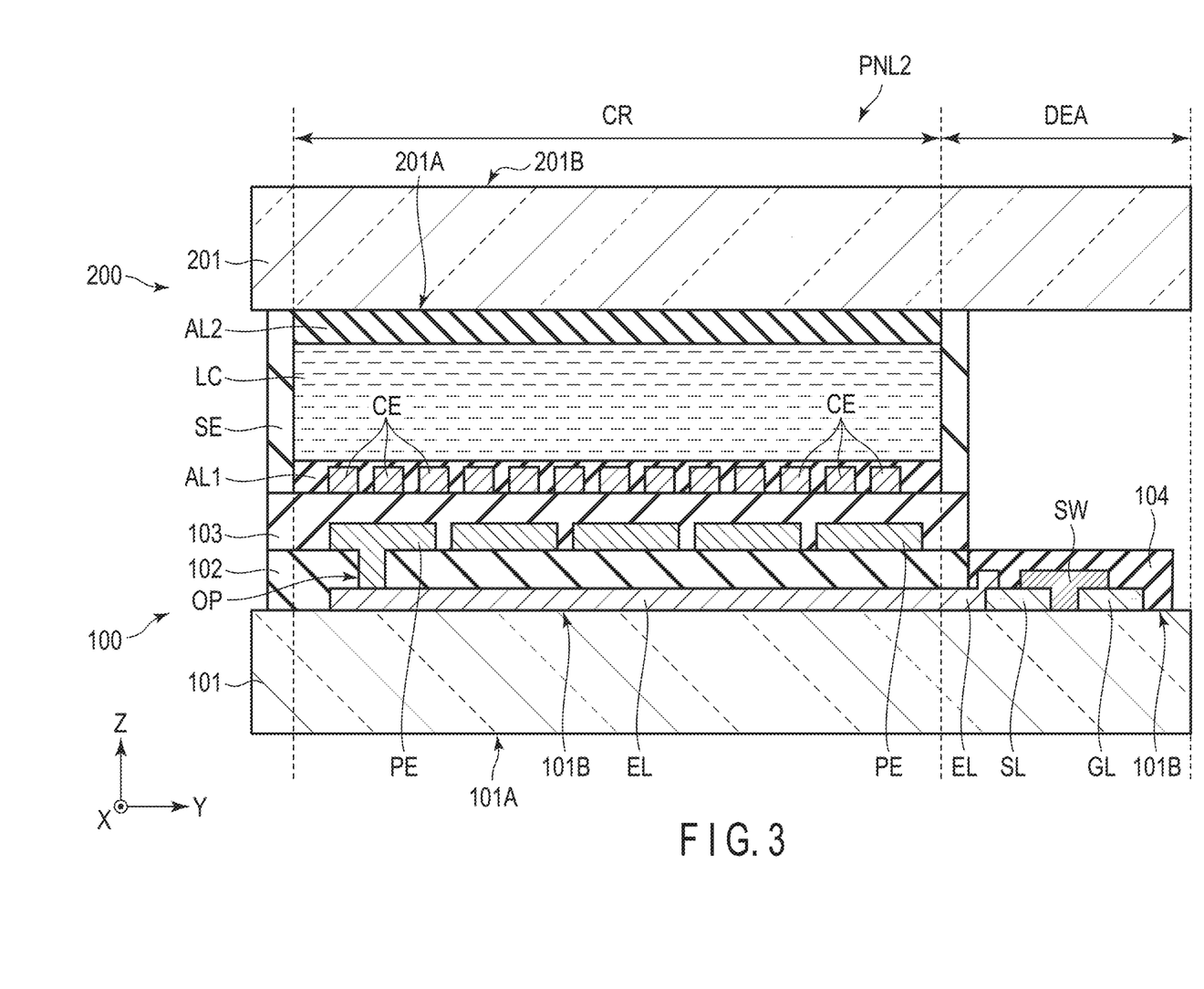
FIG. 3 is a cross-sectional view of an example of the structure of the dimming panel of FIG. 1.

FIG. 3 is a cross-sectional view of an example of the structure of the dimming panel PNL2. In the following, the structure in the light control area CR side and the structure in the drive element area DEA side will be explained, respectively.

As in FIG. 3, the dimming panel PNL2 includes a first substrate 100, second substrate 200, sealant SE, liquid crystal layer LC, first polarizer PL11, and second polarizer PL12. The first substrate 100 and the second substrate 200 are each formed as a flat plate parallel to the X-Y plane.

The first substrate 100 and the second substrate 200 overlap with each other in a plan view, and are adhered together by a sealant SE. The liquid crystal layer LC is held between the first substrate 100 and the second substrate 200, and sealed by the sealant SE. The first polarizer PL11 is arranged on the back surface of the first substrate 100, and the second polarizer PL12 is arranged on the upper surface of the second substrate 200.

In the light control area CR side, the first substrate 100 includes a transparent substrate 101, electrode line EL, first insulating layer 102, pixel electrode PE, second insulating layer 103, common electrode CE, and alignment film AL1.

The transparent substrate 101 includes a first main surface (lower surface) 101A and a second main surface (upper surface) 101B which is opposite to the first main surface 101A. The electrode line EL is arranged in the second main surface 101B side and is covered with the first insulating layer 102. The pixel electrode PE is disposed on the first insulating layer 102, and is connected to the electrode line EL through an opening OP formed in the first insulating layer 102. The pixel electrode PE is arranged for each of a number of pixels PX arranged in the light control area CR. That is, each pixel electrode PE is connected to the corresponding electrode line EL through the corresponding opening OP.

The pixel electrode PE is covered with the second insulating layer 103. A comb-shaped common electrode CE is disposed above the second insulating layer 103. The alignment film AL1 covers the common electrode CE and is in contact with the liquid crystal layer LC.

In the light control area CR side, the second substrate 200 includes a transparent substrate 201 and an alignment film AL2. The transparent substrate 201 includes a first main surface (lower surface) 201A and a second main surface (upper surface) 201B which is opposite to the first main surface 201A. The alignment film AL2 is disposed in the first main surface 201A side and is in contact with the liquid crystal layer LC.

The transparent substrates 101 and 201 are insulating substrates such as glass substrates and plastic substrates. The first insulating layer 102 and the second insulating layer 103 are formed of inorganic insulating films. The electrode line EL, pixel electrode PE, and common electrode CE are formed of, for example, indium tin oxide (ITO) or indium zinc oxide (ZnO). Note that, the electrode line EL may be formed of a metallic material instead of a transparent conductive material. The alignment films AL1 and AL2 are horizontal alignment films with an alignment restriction force substantially parallel to the X-Y plane. The alignment restriction force may be provided through a rubbing process or by a photo-alignment process.

In the drive element area DEA side, the first substrate 100 includes, as in FIG. 3, a transparent substrate 101, electrode line EL, switching element SW, scan line GL, signal line SL, and organic insulating layer (protection layer) 104. In the following, a detailed description of the structure already described as to the light control area CR side will be omitted.

In the second main surface 101B side of the transparent substrate 101, the switching element SW, scan line GL, and signal line SL are arranged. The switching element SW is connected to the scan line GL and the signal line SL. The signal line SL is connected to the electrode line EL. As described above with reference to FIG. 2, the signal line SL and the electrode line EL connected to the signal line SL receive the input luminosity data, and the voltage corresponding to the input luminosity data is applied to the pixel electrode PE connected to the electrode line EL. The drive element area DEA is covered with and protected by the organic insulating layer 104. Therefore, it is possible to prevent the elements located in the drive element area DEA from being electrically connected to other elements, resulting in a short circuit.

The organic insulating layer 104 is formed of a transparent insulating material such as silicon oxide, silicon nitride, silicon oxynitride, or acrylic resin. Note that, the first insulating layer 102 in the light control area CR side and the organic insulating layer 104 in the drive element area DEA side may be formed by the same process. In that case, the first insulating layer 102 is formed of the same insulating material (organic insulating film) as the organic insulating layer 104. The scan line GL and the signal line SL are formed by a metal material (low-resistance material).

Although omitted in FIG. 3, the gate driver GD, source driver SD, and the like are also located in the drive element area DEA.

Here, effects of the display device DSP1 (dimming panel PNL2) of the present embodiment will be explained using a comparative example. The comparative example is intended to illustrate some of the effects achieved by the display device DSP1 of the present embodiment, and the effects common to the comparative example and the present embodiment are not excluded from the scope of the present invention.

Figure 4:
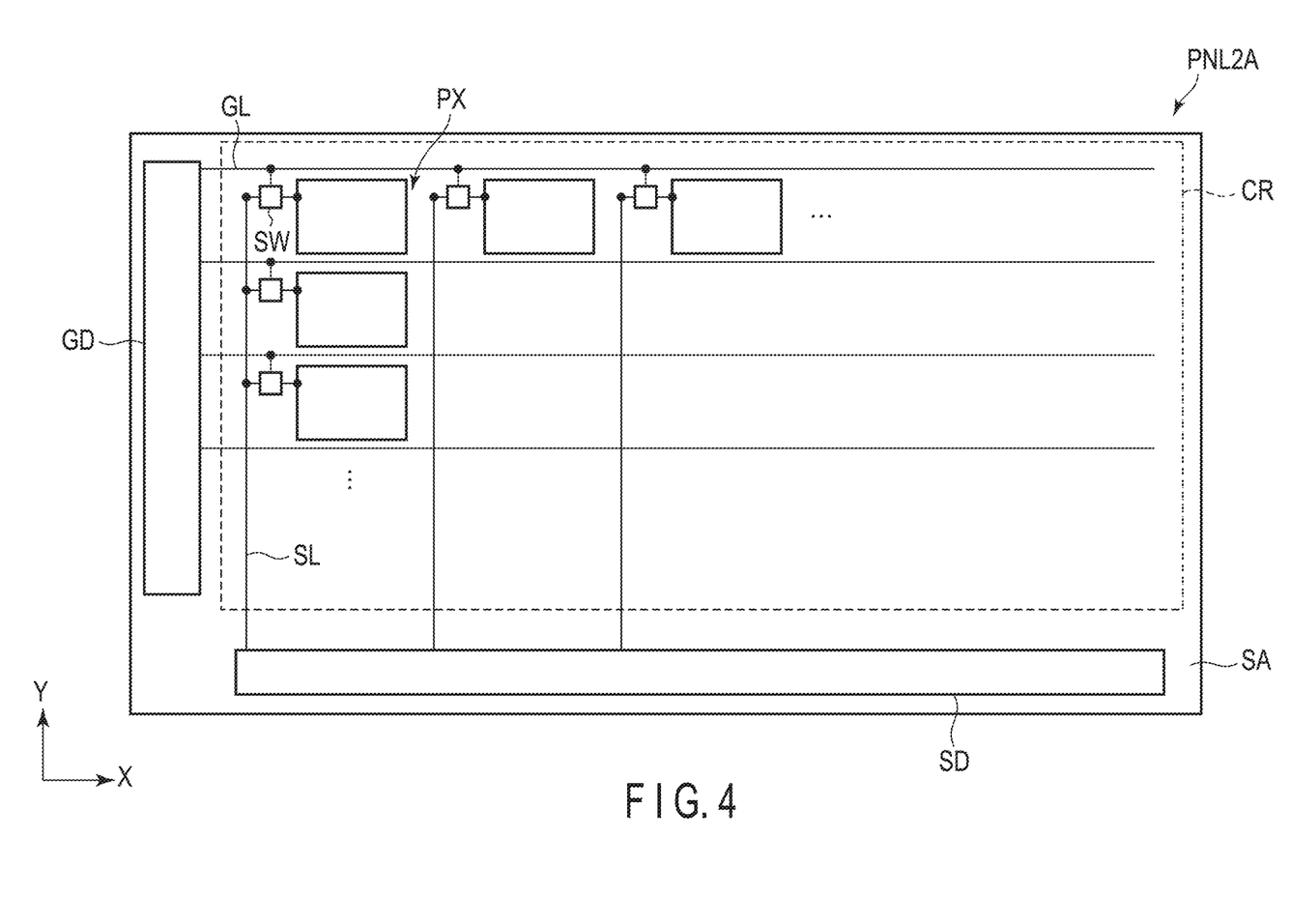
FIG. 4 is a plan view of an example of the structure of a dimming panel of a comparative example.

FIG. 4 is a plan view of an example of the structure of the dimming panel PNL2A of the comparative example. As in FIG. 4, the dimming panel PNL2A of the comparative example is different from the dimming panel PNL2 of the present embodiment because it includes a scan line GL, signal line SL, and switching element SW located in a light control area CR, as in FIG. 4.

In the dimming panel PNL2A of the comparative example, the scan lines GL are located in the light control area CR, while extending in the first direction X and being aligned at intervals in the second direction Y. One end of the scan line GL is electrically connected to the gate driver GD, which is disposed in a peripheral area SA. The signal lines SL are located in the light control area CR, while extending in the second direction Y, and being aligned at intervals in the first direction X. One end of the signal line SL is electrically connected to the source driver SD located in the peripheral area SA. Pixel PX is located in an area surrounded by two adjacent scan lines GL and two adjacent signal lines SL. The switching element SW is electrically connected to the scan line GL, signal line SL, and pixel PX.

In the dimming panel PNL2A of the comparative example, as described above, the scan line GL and the signal line SL formed of a metal material are arranged in the light control area CR, and the switching element SW electrically connected to the above scan line GL and signal line SL is also located in the light control area CR. Thus, the aperture ratio of the light control area CR is reduced thereby, and the aperture ratio is less than 100%. If the scan line GL and the signal line SL are placed in the light control area CR, such scan line GL and signal line SL may interfere scan lines an video signal lines of the liquid crystal panel disposed above the dimming panel PNL2A, causing moire.

In contrast, the dimming panel PNL2 of the present embodiment includes the scan line GL, signal line SL and switching element SW located in the drive element area DEA included in the peripheral area SA, instead of the light control area CR. Therefore, it is possible to suppress the reduction of the aperture ratio of the light control area CR as described above. Note that, since the electrode line EL is formed of a transparent conductive material, the aperture ratio of the light control area CR can be set to 100%.

Furthermore, since the scan line GL, signal line SL, and switching element SW are placed in the drive element area DEA, such elements do not overlap with the scan line and video signal line of the liquid crystal display panel PNL1 in a plan view. Thus, the aforementioned possibility of moire can be suppressed.

Furthermore, in the dimming panel PNL2 of the present embodiment, the number of rows and columns of pixels PX arranged in a matrix in the light control area CR and the number of rows and columns of scan lines GL and signal lines SL, respectively, arranged in the drive element area DEA are not required to be the same. Thus, for example, it is possible to make the number of rows $\beta$ of scan lines GL smaller than the number of rows M of pixels PX (that is, $\beta<M$). Thus, as compared to the case where the number of rows $\beta$ of scan lines GL and the number of rows M of pixels PX are the same, the time required to write luminosity data to each pixel PX can be extended. Therefore, even if the number of pixels arranged in the dimming panel PNL2 increases according to enlargement and higher definition make of the display device DSP1, it is possible to secure enough time to write luminosity data to each pixel PX. As a result, it is applicable to the display device DSP1 with a larger screen size and higher resolution.

In the present embodiment described above, a display device DSP1 includes a liquid crystal display panel PNL1 and a dimming panel PNL2, and the structure of the present embodiment is applied to the dimming panel PNL2, specifically, the structure in which a drive element area DEA is provided with a peripheral area SA and a drive element to drive a number of pixels PX is disposed in the drive element area DEA is applied to the dimming panel PNL2. However, the structure of the present embodiment is not limited thereto, and can also be applied, for example, to a display device to which a polymer-dispersed liquid crystal is applied. In the following, the case in which the structure of the present embodiment is applied to a display device to which a polymer-dispersed liquid crystal is applied will be described.

Figure 5:
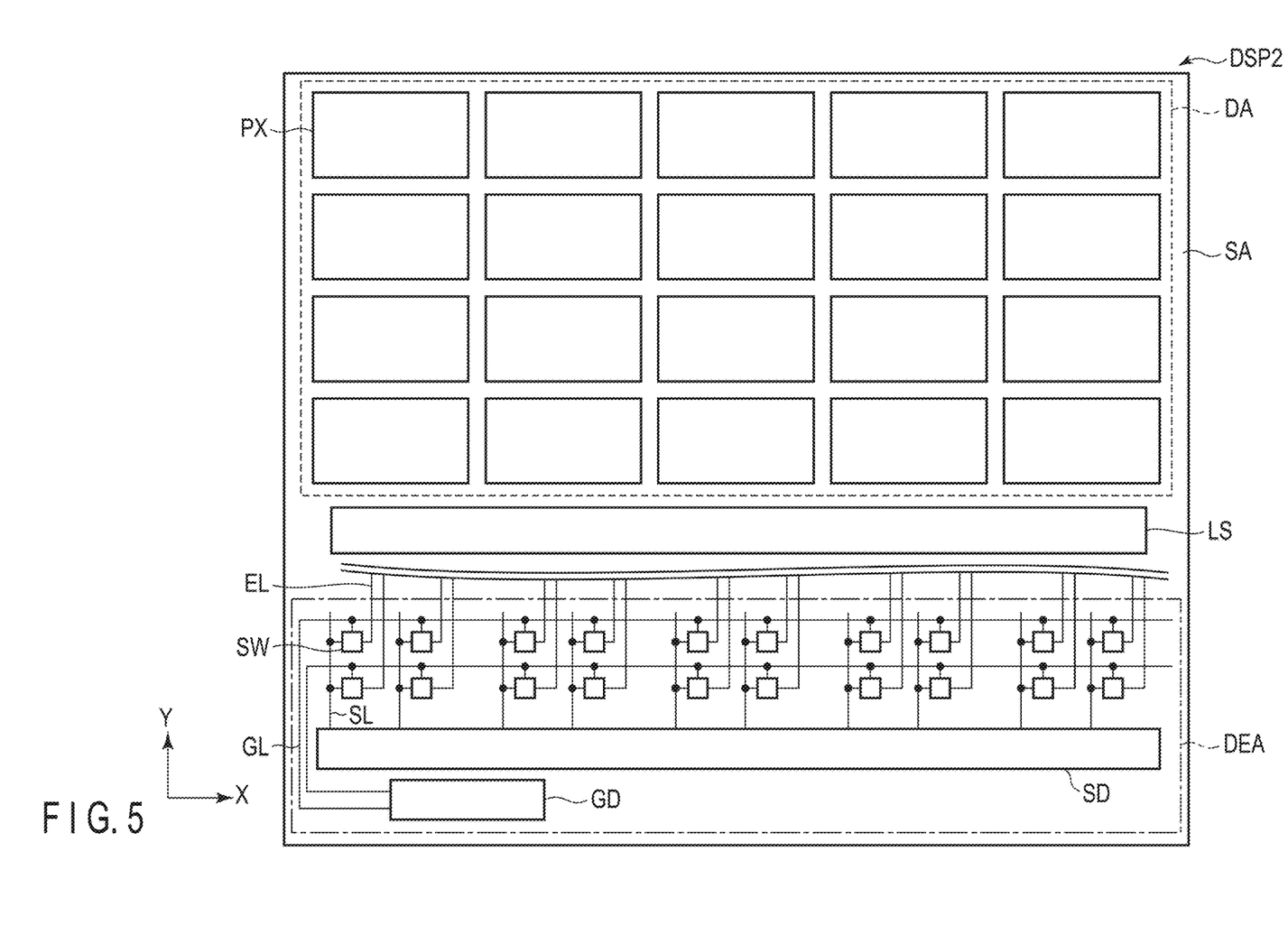
FIG. 5 is a plan view of another example of the structure of the display device of the embodiment.

FIG. 5 is a plan view of an example of the structure of a display device DSP2 of the present embodiment. The display device DSP2 may be referred to as electronic apparatus. As in FIG. 5, the display device DSP2 includes a display area DA and a peripheral area SA located outside of the display area DA. The display area DA corresponds to the active area of the display device DSP2. The display area DA includes (N [columns]×M [rows]) pixels PX are arranged in a matrix as in the light control area CR of the dimming panel PNL2 of FIG. 2. Each pixel PX includes, for example, a pixel electrode PE, common electrode CE, liquid crystal layer LC, and electrode line EL.

The peripheral area SA includes a drive element area DEA. The drive element area DEA includes, as in the drive element area DEA of the dimming panel PNL2 of FIG. 2, β scan lines GL and α signal lines SL, (α×β) switching elements SW, gate driver GD, source driver SD, and (α×β) electrode lines EL. In that case, a relationship equation between the number of pixels PX and the number of switching element SWs is (α×β)≥(N×M) The β scan lines GL extend in the first direction X and are aligned at intervals in the second direction Y. The α signal lines SL extend in the second direction Y and are aligned at intervals in the first direction X. The (α×β) switching elements SW are each arranged in the area surrounded by two adjacent scan lines GL and two adjacent signal lines SL. Each switching element SW is electrically connected to the scan line GL and the signal line SL. Although this is omitted from FIG. 5 for convenience of explanation, each switching element SW is electrically connected to a single corresponding pixel (pixel to be driven) among the pixels PX arranged in a matrix in the display area DA through the electrode line EL.

One end of the scan line GL is electrically connected to the gate driver GD. The gate driver GD outputs scan signals to control a write operation of video data to each pixel PX. One end of the signal line SL is electrically connected to the source driver SD. The video data to each pixel PX are input to the signal line SL. The video data are input to each pixel PX through the signal line SL, switching element SW, and electrode line EL. Each pixel PX is supplied with a voltage corresponding to the input video data. This generates an electric field between the pixel electrode PE and the common electrode CE in each pixel PX, and the electric field changes the alignment of liquid crystal molecules of the liquid crystal layer LC from the initial alignment state where no voltage is applied thereto. Thus, an image is displayed in the display area DA.

In the peripheral area SA of the display device DSP2 includes a light source LS. Specifically, the light source LS is arranged between the display area DA and the drive element area DEA in the peripheral area SA. In FIG. 5, the light source LS is located in the area between the display area DA and the drive element area DEA in the peripheral area SA. However, this is not limited thereto, and the light source LS may be disposed in the drive element area DEA included in the peripheral area SA.

The light source LS irradiates light toward the display area DA. The light irradiated from the light source LS propagates within the display area DA to display images in the display area DA.

Figure 6:
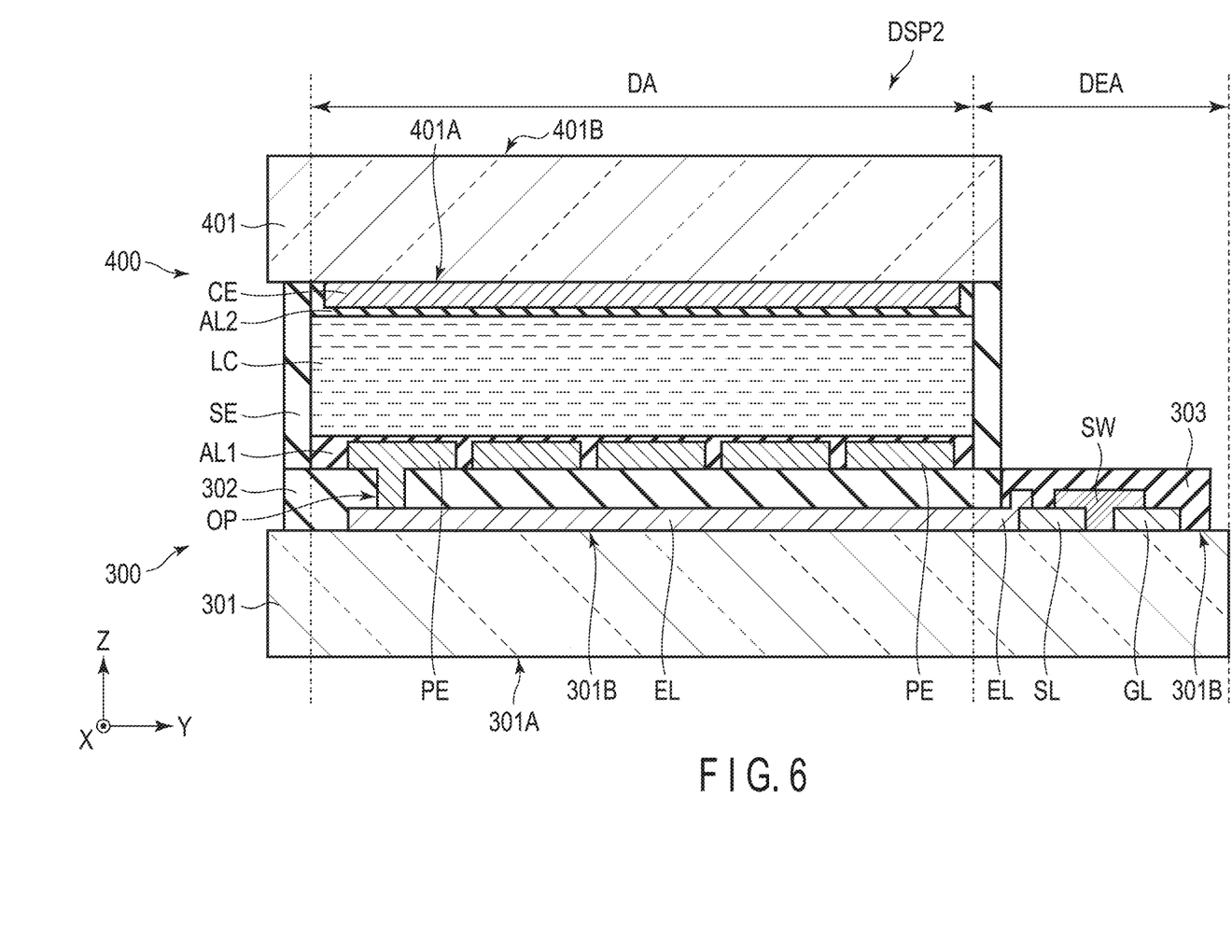
FIG. 6 is a cross-sectional view of an example of the structure of the display device of FIG. 5.

FIG. 6 is a cross-sectional view of an example of the structure of the display device DSP2. In the following, the structure in the display area DA side and the structure in the drive element area DEA side will be explained, respectively.

As in FIG. 6, the display device DSP2 includes a first substrate 300, second substrate 400, sealant SE, and liquid crystal layer LC. The first substrate 300 and the second substrate 400 are each formed in a flat plate parallel to the X-Y plane.

The first substrate 300 and second substrate 400 overlap with each other in a plan view, and adhered by the sealant SE. The liquid crystal layer LC is held between the first substrate 300 and the second substrate 400, and sealed by the sealant SE. Although a detailed explanation is omitted here, the liquid crystal layer LC is a polymer-dispersed liquid crystal, and in a state where no electric field acts thereon or the electric field is extremely weak, light incident on the liquid crystal layer LC is transmitted through the liquid crystal layer LC with almost no scattering. On the other hand, when a sufficient electric field is applied to the liquid crystal layer LC, light incident on the liquid crystal layer LC is scattered within the liquid crystal layer LC.

In the display area DA side, the first substrate 300 includes a transparent substrate 301, electrode line EL, insulating layer 302, pixel electrode PE, and alignment film AL1.

The transparent substrate 301 includes a first main surface (lower surface) 301A and a second main surface (upper surface) 301B in the opposite side of the first main surface 301A. The electrode line EL is disposed in the second main surface 301B side and is covered with an insulating layer 302. The pixel electrode PE is disposed on the insulating layer 302 and is connected to the electrode line EL through an opening OP formed in the insulating layer 302. The pixel electrode PE is arranged for each of a number of pixels PX arranged in the display area DA. That is, each pixel electrode PE is connected to the corresponding electrode line EL through the corresponding opening OP.

The pixel electrode PE is covered with the alignment film AL1. The alignment film AL1 is in contact with the liquid crystal layer LC.

In the display area DA side, the second substrate 400 includes a transparent substrate 401, common electrode CE, and alignment film AL2. The transparent substrate 401 includes a first main surface (lower surface) 401A and a second main surface (upper surface) 401B in the opposite side of the first main surface 401A. The common electrode CE is disposed in the first main surface 401A side, and is opposed to the pixel electrode CE in the first substrate 300 side. The alignment film AL2 covers the common electrode CE, and is in contact with the liquid crystal layer LC. Although this is not shown in FIG. 6 for convenience of explanation, a color filter and a light shielding film are disposed on the second substrate 400.

The transparent substrates 301 and 401 are insulating substrates such as glass substrates and plastic substrates. The insulating layer 302 is formed of an inorganic insulating film. The electrode line EL, pixel electrode PE, and common electrode CE are formed of a transparent conductive material such as indium tin oxide (ITO) or indium zinc oxide (IZO). Note that, the electrode line EL may be formed of a metallic material instead of a transparent conductive material, but in this example, use of a transparent conductive material is preferred. The alignment films AL1 and AL2 have an alignment restriction force which is approximately parallel to the X-Y plane. The alignment restriction force may be provided by a rubbing process or by a photo-alignment process.

In the drive element area DEA side, the first substrate 300 includes, as in FIG. 6, a transparent substrate 301, electrode line EL, switching element SW, scan line GL, signal line SL, and organic insulating layer (protective layer) 303. In the following, a detailed description of the structure already described in the display area DA side will be omitted.

In the second main surface 301B side of the transparent substrate 301, the switching element SW, scan line GL, and signal line SL are disposed. The switching element SW is connected to the scan line GL and the signal line SL. The signal line SL is connected to the electrode line EL. As described above with reference to FIG. 5, video data are input to the signal line SL and the electrode line EL connected to the signal line SL, and the voltage corresponding to the input video data is applied to the pixel electrode PE connected to the electrode line EL. The drive element area DEA is covered with and protected by the organic insulating layer 303. Therefore, it is possible to prevent the elements in the drive element area DEA from being electrically connected to other elements, resulting in a short circuit.

The organic insulating layer 303 is formed of a transparent insulating material such as silicon oxide, silicon nitride, silicon oxynitride, or acrylic resin. Note that, the first insulating layer 302 in the display area DA side and the organic insulating layer 303 in the drive element area DEA side may be formed by the same process. In that case, the first insulating layer 302 is formed of the same insulating material (organic insulating film) as the organic insulating layer 303. The scan line GL and the signal line SL are formed by a metal material (low-resistance material).

Although omitted in FIG. 6, a gate driver GD, a source driver SD, and the like are also arranged in the drive element area DEA.

Figure 7:
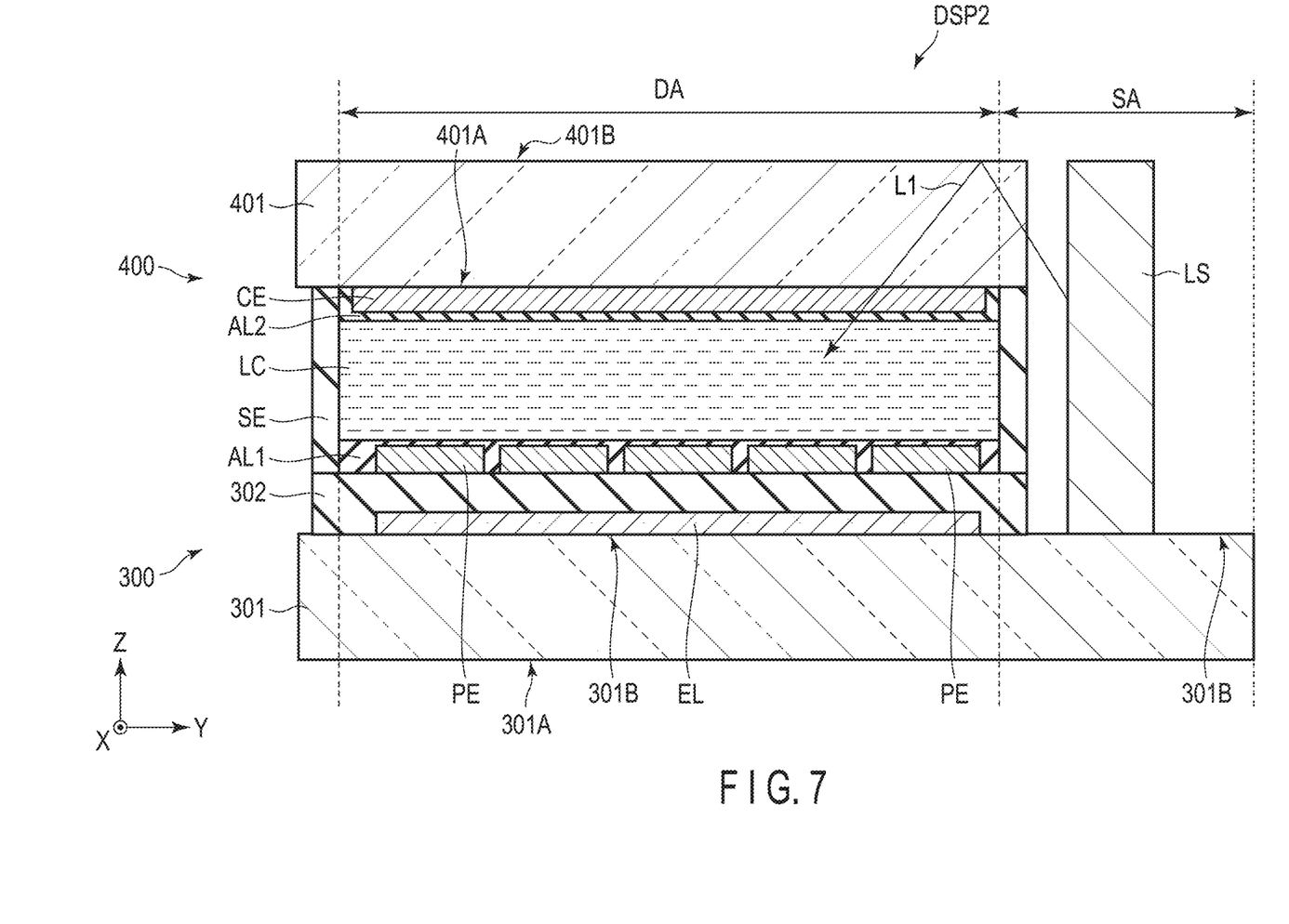
FIG. 7 is a cross-sectional view of an example of the structure of the display device of FIG. 5, the cross-section therein is different from that of FIG. 6.

FIG. 7 is a cross-sectional view of an example of the structure of the display device DSP2, which is different from that of FIG. 6. In the following, only the elements which differ from those in FIG. 6 will be described, and the detailed description of the structure already described with reference to FIG. 6 will be omitted.

As in FIG. 7, in the peripheral area SA side, a light source LS is disposed on the first substrate 300, or specifically, on the second main surface 301B of the transparent substrate 301. The light source LS is positioned so as to face the side surface of the second substrate 400. Light L1 from the light source LS is irradiated onto the side surface of the second substrate 400. The light L1 incident from the side surface of the second substrate 400 propagates within the display area DA while repeating reflection. When the voltage corresponding to the video data is not applied to the pixel electrode PE, the light L1 is hardly scattered in the liquid crystal layer LC. Therefore, the light L1 hardly leaks out from the first substrate 300 and the second substrate 400. That is, when the display area DA is viewed from the second substrate 400 side, the background in the first substrate 300 side is visible, and when viewing the display area DA from the first substrate 300 side, the background in the second substrate 400 side is visible.

On the other hand, when the voltage corresponding to the video data is applied to the pixel electrode PE, light L1 is scattered in the liquid crystal layer LC. The scattered light scattered in the liquid crystal layer LCs is emitted from the first substrate 300 and the second substrate 400, and is visible as a displayed image.

Here, effects of the display device DSP2 of the present embodiment will be explained using a comparative example. The comparative example is intended to illustrate some of the effects achieved by the display device DSP2 of the present embodiment, and the effects common to the comparative example and the present embodiment are not excluded from the scope of the present invention.

Figure 8:
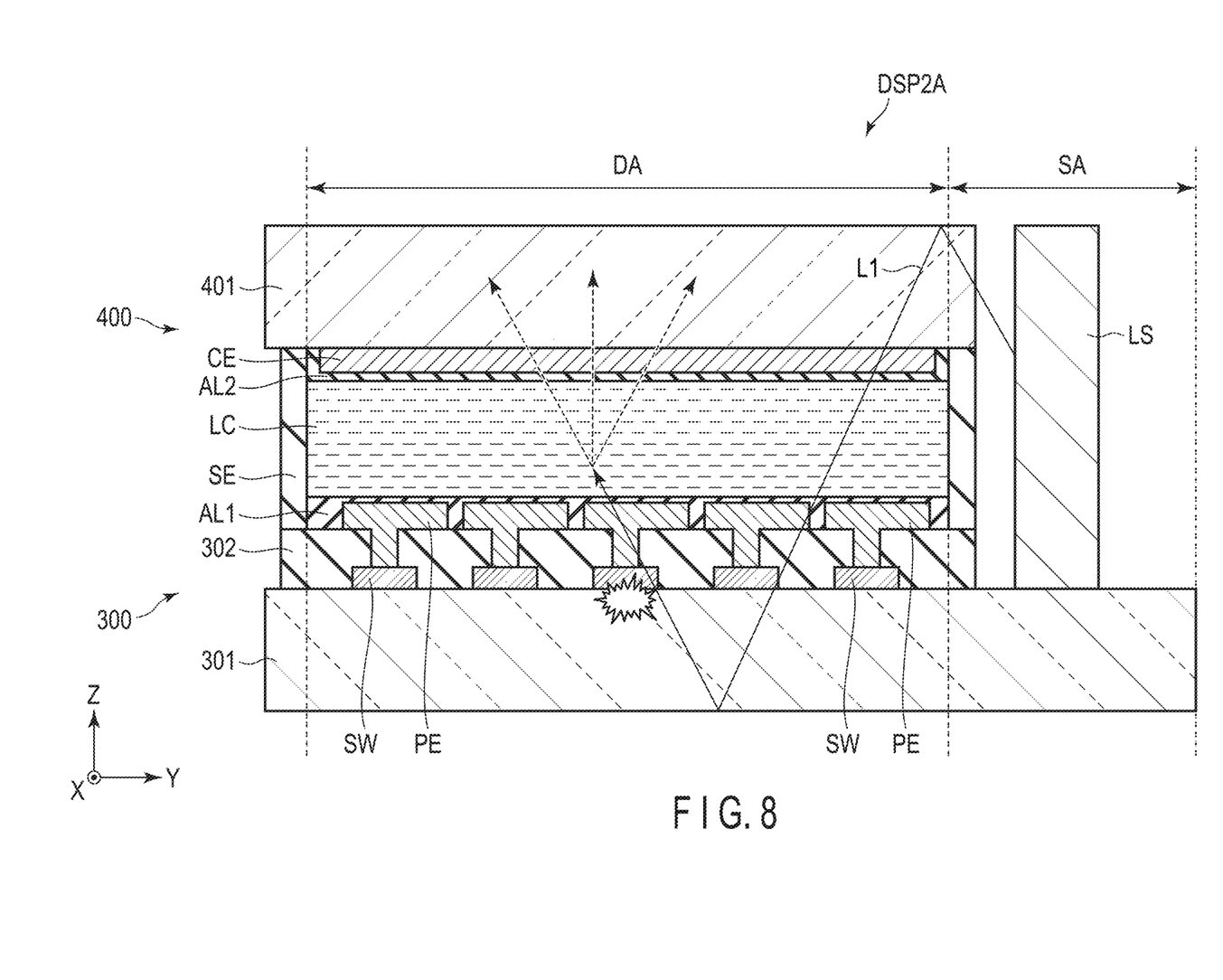
FIG. 8 is a cross-sectional view of an example of the structure of a display device of a comparative example.

FIG. 8 is a cross-sectional view of an example of the structure of ae display device DSP2A of a comparative example. As in FIG. 8, the display device DSP2A of the comparative example incudes the switching element SW in the display area DA, and in this respect, differs from the display device DSP2 of the present embodiment. Although this is omitted in FIG. 8 for convenience of explanation, a scan line GL and a signal line SL, which are electrically connected to the switching element SW, are also located in the display area DA, and in this respect, the display device DSP2 of the present embodiment differs from the display device DSP2A of the comparative example.

In the display device DSP2A of the comparative example, the scan line GL and the signal line SL formed of a metal material are placed in the display area DA, and the switching element SW electrically connected to the scan line GL and the signal line SL is placed in the display area DA. Therefore, as in FIG. 8, light L1 propagating in the display area DA may be partially reflected by the switching element SW, scan line GL, and signal line SL, and thus be prevented from propagating in the display area DA or be scattered at unexpected locations. Thus, the luminosity of the displayed image decreases, the displayed image contains rainbow (such as rainbow-colored halo), and the display quality is deteriorated.

In contrast, the display device DSP2 of the present embodiment includes a scan line GL, signal line SL, and switching element SW in the drive element area DEA included in the peripheral area SA, instead of the display area DA, and thus, light L1 propagating in the display area DA is not reflected by the switching element SW, scan line GL, signal line SL or the like. Therefore, it is possible to suppress the above-mentioned deterioration of the display quality. Furthermore, the display device DSP2 of the present embodiment includes the scan line GL, signal line SL, and switching element SW in the drive element area DEA included in the peripheral area SA instead of the display area DA, and thus, as compared to the comparative example, the aperture ratio of the display area DA can be improved.

Furthermore, in the display device DSP2 of the present embodiment, as in the dimming panel PNL2 of FIGS. 2 and 3, the number of rows and columns of pixels PX arranged in a matrix in the display area DA and the number of rows and columns of scan lines GL and signal lines SL, respectively, arranged in the drive element area DEA are not required to be the same. Thus, for example, it is possible to make the number of rows β of scan lines GL smaller than the number of rows M of pixels PX (that is, β<M). Thus, as compared to the case where the number of rows β of scan lines GL and the number of rows M of pixels PX are the same, the time required to write luminosity data to each pixel PX can be extended. Therefore, even if the number of pixels arranged in the dimming panel PNL2 increases according to enlargement and higher definition make of the display device DSP1, it is possible to secure enough time to write luminosity data to each pixel PX. As a result, it is applicable to the display device DSP1 with a larger screen size and higher resolution.

Note that, the structure of the present embodiment can be applied to reflective and transmissive liquid crystal display devices in addition to the above dimming panel PNL2 and display DSP2. Even in such cases, as in the case of the dimming panel PNL2 and display device DSP 2, the aperture ratio of the display area can be improved and the luminosity of the liquid crystal display devices can be increased.

According to the above-described embodiment, an electronic apparatus (dimming panel PNL2 and display device DSP2) and a display device (display device DSP1) by which an aperture ratio of an active area (light control area CR and display area DA of display device DSP2) included in a liquid crystal panel can be improved will be achieved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
a first substrate;
a second substrate opposed to the first substrate;
a liquid crystal layer held between the first substrate and the second substrate;
an active area in which pixels are arranged; and
a peripheral area positioned in a periphery of the active area, wherein
the peripheral area includes a drive element area in which a drive element configured to drive each of the pixels is arranged, and
the drive element area includes:
scan lines extending in a row direction and aligned at intervals in a column direction crossing the row direction;
signal lines extending in the column direction and aligned at intervals in the row direction;
a gate driver connected to one end of each scan line;
a source driver connected to one end of each signal line;
switching elements connected to the other end of each scan line and the other end of each signal line, and arranged in an area surrounded by two adjacent scan lines and two adjacent signal lines; and
connecting lines connecting each switching element to each pixel.

2. The electronic apparatus of claim 1, wherein the number of the switching elements arranged in the drive element area is equal to or more than the number of the pixels arranged in the active area.

3. The electronic apparatus of claim 2, wherein
the pixels and the switching elements are both arranged in a matrix, and
the number of rows of the pixels and the number of rows of the switching elements are different, and the number of columns of the pixels and the number of columns of the switching elements are different.

4. The electronic apparatus of claim 3, wherein
the number of rows of the switching elements are greater than the number of rows of the pixels, and
the number of columns of the switching elements are greater than the number of columns of the pixels.

5. The electronic apparatus of claim 1, wherein the connecting lines are formed of a transparent conductive material.

6. A display device comprising:
an electronic apparatus of claim 1;
a liquid crystal display panel disposed on the electronic apparatus; and
a backlight disposed on a back surface of the electronic apparatus.

7. An electronic apparatus comprising:
a first substrate;
a second substrate opposed to the first substrate;
a liquid crystal layer held between the first substrate and the second substrate;
an active area in which pixels are arranged;
a peripheral area positioned in a periphery of the active area; and
a light source arranged in the peripheral area and arranged in a position opposed to a side surface of the second substrate, wherein
the peripheral area includes a drive element area in which a drive element configured to drive each of the pixels is arranged,
the liquid crystal layer includes a polymer-dispersed liquid crystal, and
the drive element area includes:
scan lines extending in a row direction and aligned at intervals in a column direction crossing the row direction;
signal lines extending in the column direction and aligned at intervals in the row direction;
a gate driver connected to one end of each scan line;
a source driver connected to one end of each signal line;
switching elements connected to the other end of each scan line and the other end of each signal line, and arranged in an area surrounded by two adjacent scan lines and two adjacent signal lines; and
connecting lines connecting each switching element to each pixel.

8. The electronic apparatus of claim 7, wherein the number of the switching elements arranged in the drive element area is equal to or more than the number of the pixels arranged in the active area.

9. The electronic apparatus of claim 8, wherein
the pixels and the switching elements are both arranged in a matrix, and
the number of rows of the pixels and the number of rows of the switching elements are different, and the number of columns of the pixels and the number of columns of the switching elements are different.

10. The electronic apparatus of claim 9, wherein
the number of rows of the switching elements are greater than the number of rows of the pixels, and
the number of columns of the switching elements are greater than the number of columns of the pixels.

11. The electronic apparatus of claim 7, wherein the connecting lines are formed of a transparent conductive material.

12. A display device comprising:
an electronic apparatus of claim 7;
a liquid crystal display panel disposed on the electronic apparatus; and
a backlight disposed on a back surface of the electronic apparatus.

* * * * *